United States Patent [19]

Yakabe et al.

[11] Patent Number: 5,224,347
[45] Date of Patent: Jul. 6, 1993

[54] METHOD AND APPARATUS FOR CONTROLLING THE AIR-FUEL RATIO OF A GAS ENGINE

[75] Inventors: Hisataka Yakabe, Tokyo; Masakazu Hishinuma, Kanagawa, both of Japan

[73] Assignee: Tokyo Gas Co., Ltd., Tokyo, Japan

[21] Appl. No.: 754,981

[22] Filed: Sep. 6, 1991

[30] Foreign Application Priority Data

Sep. 10, 1990 [JP] Japan ................... 2-237200

[51] Int. Cl.⁵ ............................................. F01N 3/20
[52] U.S. Cl. ................................... 60/274; 60/276; 60/285; 123/527; 123/691
[58] Field of Search ............... 60/274, 276, 285; 123/694, 691, 527

[56] References Cited

U.S. PATENT DOCUMENTS

| | | | |
|---|---|---|---|
| 4,235,204 | 11/1980 | Rice | 60/276 |
| 4,375,796 | 3/1983 | Ohgami | 123/694 |
| 4,378,773 | 4/1983 | Ohgami | 123/694 |

*Primary Examiner*—Douglas Hart
*Attorney, Agent, or Firm*—Beveridge, DeGrandi, Weilacher & Young

[57] ABSTRACT

A method and apparatus for controlling and improving the air-fuel ratio of a gas engine by controlling the air-fuel ratio on an exhaust purifying apparatus such as a three way catalyst in use with the gas engine. The method involves the steps of modulating a vibrational drive current for driving a bypass value with waveforms such as rectangular wave, sinusoidal wave, triangular wave, etc., with predetermined periods and amplitudes, in response to signals transmitted from a main oxygen sensor and a pressure sensor. The main oxygen sensor being installed on an up-stream side relative to the three way catalyst interposed on an exhaust line of the gas engine, and the pressure sensor being installed on an intake line in communication with a mixer; detecting distortion of responded waveforms of signals transmitted from a sub oxygen sensor, which sensor is installed on a down-stream side of the three way catalyst; and controlling the drive current so as to remove the detected distortions, in order to help optimize the air-fuel ratio of the gas engine. The invention thus helps in optimizing control of the air-fuel ratio and helps in the purification efficiency of the gas engine exhaust.

2 Claims, 11 Drawing Sheets

Distortion Signal (T1−T2)

FIG. 5

Distortion Signal (Mean Gradient)

FIG. 6

| Intake Pressure \ Number of Revolutions | 1000 | 1500 | 2000 | 2500 | (rpm) 3000 |
|---|---|---|---|---|---|
| 100 | 1 | 2 | 3 | 4 | 5 |
| 150 | 2 | 3 | 4 | 5 | 6 |
| 200 | 3 | 4 | 5 | 6 | 7 |
| 250 | 4 | 5 | 6 | 7 | 8 |
| 300 mmH$_2$O | 5 | 6 | 7 | 8 | 9 |

FIG. 7

Signal of Sub Oxygen Sensor ↓

↓ Compulsory Compensating Signal

METHOD AND APPARATUS FOR CONTROLLING THE AIR-FUEL RATIO OF A GAS ENGINE

BACKGROUND OF THE INVENTION

1. Field of the Invention

The present invention relates to a method and apparatus for controlling the air-fuel ratio of a gas engine by controlling the air-fuel ratio on an exhaust purifying apparatus such as a three way catalyst associated with the gas engine.

2. Background Discussion

Figure 10:
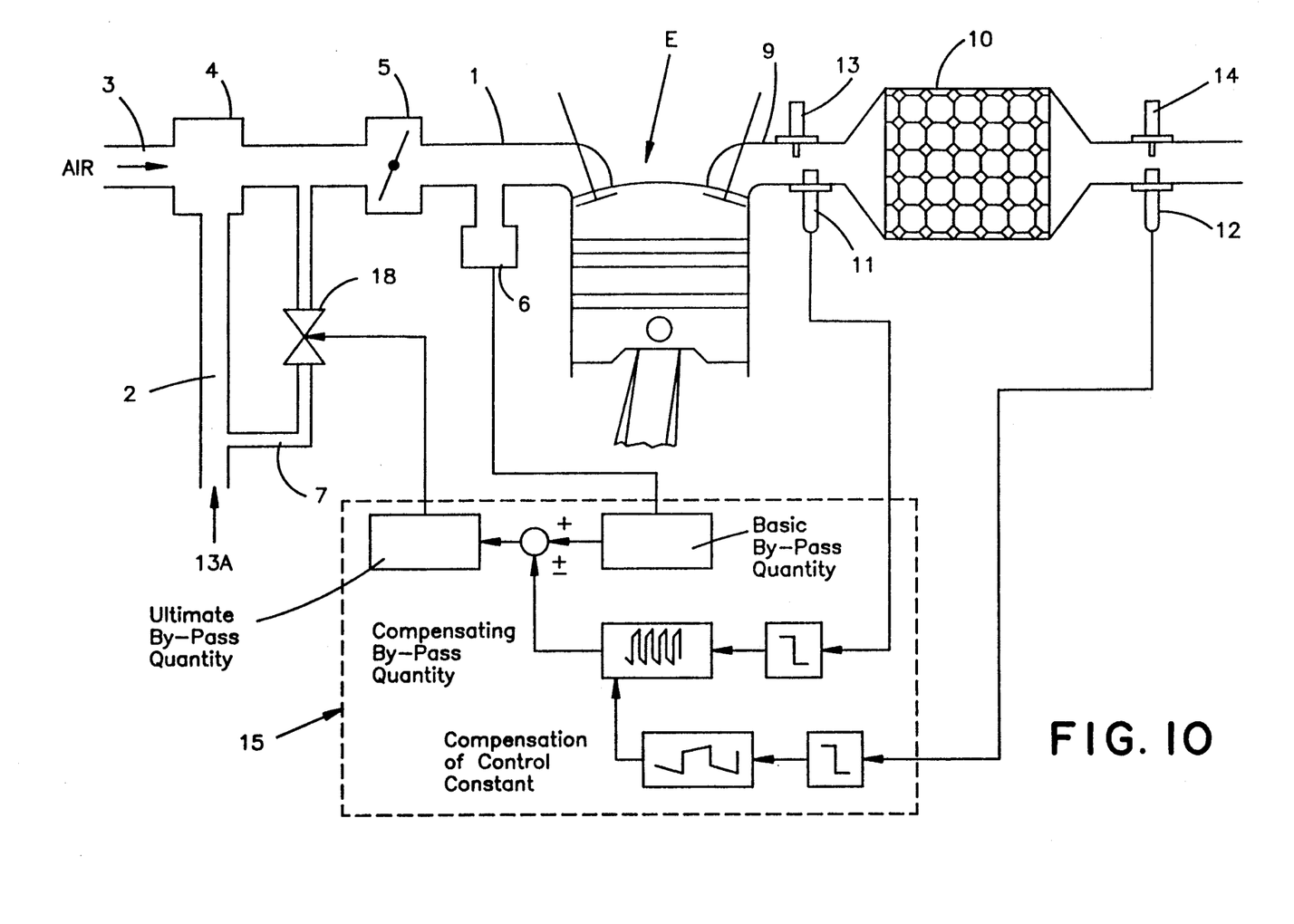
FIG. 10 is a general block diagram showing a prior system.

A gas engine system suitable for use in the present invention is shown in FIG. 10. As shown in FIG. 10, on an intake line 1 of gas engine E, there is positioned a mixer 4 for mixing fuel (such as town gas 13A) supplied from a fuel line 2 with air supplied from an air intake 3, a throttle valve 5, and a pressure sensor 6 detecting intake pressure.

Also, on by-pass line 7, which connects the fuel line 2 to a line between the mixer 4 on the intake line 1 and the throttle vale 5, there is positioned by-pass valve 18 which is in the form of an air-fuel ratio control valve.

On the other hand, on exhaust line 9, three way catalyst 10 is interposed. On an up-stream side of three way catalyst 10, there is positioned a main oxygen sensor 11 and a front (up-stream side) thermometric sensor 13. Also, on the down-stream side of three way catalyst 10, there is provided sub oxygen sensor 12 and a rear (down-stream side) thermometric sensor 14. (The phrase "up-stream" means a side near the intake 3. On the other hand, the phrase "down-stream" means a side away from said intake 3.)

The pressure sensor 6, both of the oxygen sensors, and the air-fuel ratio control value 18 are connected to a control unit, respectively, which unit is represented by reference numeral 15. The control unit 15 sets up a basic by-pass quantity in response to a signal transmitted from pressure sensor 6, sets up a control constant based on a main feed-back from the main oxygen sensor 11, determines a compensating by-pass quantity by compensating the control based on a sub feed-back from the sub oxygen sensor, compensates the basic by-pass quantity due to the compensating by-pass quantity, and sets up the final by-pass quantity so that said unit controls the drive current driving the air-fuel ratio control value.

It is well-known that, in order to make the three way catalyst effectively function in the above-mentioned control method, an air-fuel ratio between air and fuel gas should be adjusted within an extremely narrow range, the so-called window (Approximately 0.995/0.005, in air-fuel ratio). In the above-mentioned control method, when a mixed state of air and fuel gas through mixer 4 is kept a little leaner (surplus air state), a shortage of fuel gas is supplied by air-fuel ratio control valve 18 (via the by-pass line 7). In this situation, the supply of fuel gas is carried out as follows:

(1) Detection of Air-Fuel Ratio

Figure 11:
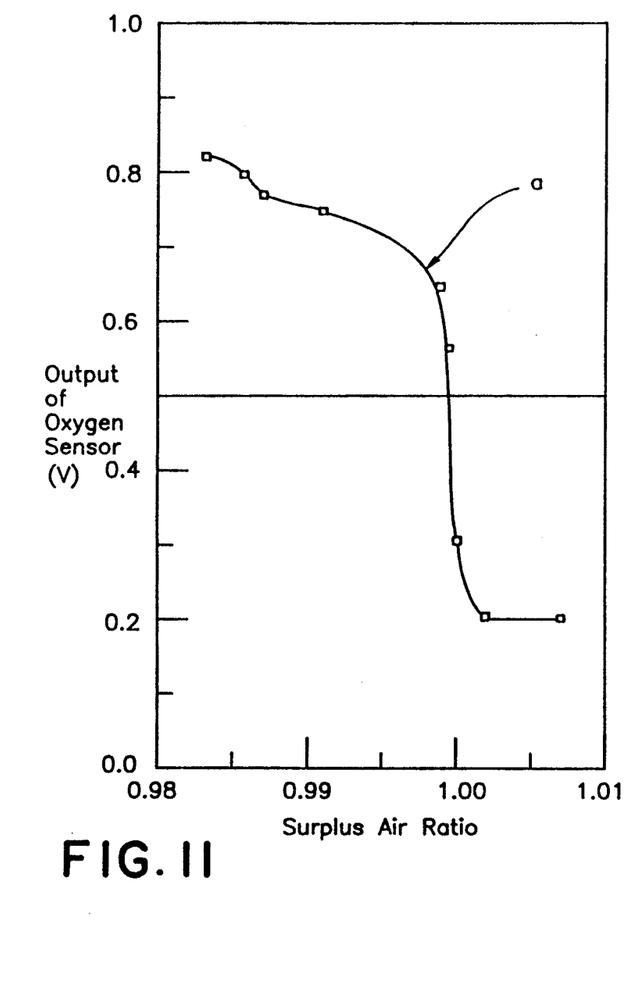
FIG. 11 is a characteristic diagram of oxygen sensor output vs. air-fuel ratio.

This detection is carried out by the main oxygen sensor 11. Since output characteristics of the oxygen sensor are of a nonlinear type as shown in FIG. 11, with output voltage near 0.5 V as threshold, the air-fuel ratio is judged to be rich when the voltage is over 0.5 V. On the other hand, when the voltage is under 0.5 V, the air-fuel ratio is judged to be lean.

(2) Control Signal of Air-Fuel Ratio Control Valve 18

The control signal is output in such a fashion that the valve 18 will be shut if the signal transmitted from the main oxygen sensor 11 indicates rich. Also, the valve 18 will be opened if the above-mentioned signal indicates lean.

The above-mentioned prior control method presents problems such as those described as follows:

(1) Since there is a difference in location between a trailing point of inflection in an output characteristic of the oxygen sensor and the center of the air-fuel ratio window, the center of the window must be located at a so-called "shoulder" portion. This so-called "shoulder" portion is represented by letter "a" (essentially the 0.6 to 0.7 V output shown in FIG. 11) of the output curve of the oxygen sensor.

(2) Since the output characteristic of the oxygen sensor is of a nonlinear type, a great difference in the air-fuel ratio will be generated due to a little difference in the output of the oxygen sensor at shoulder a.

(3) Since the oxygen sensor has a temperature characteristic and the output value of said sensor will vary greatly depending upon the exhaust temperature, control at shoulder a will be influenced by the temperature.

(4) During use of the oxygen sensor over a long period of time, there is a possibility of deterioration thereof. If the output value of the sensor falls or shifts, it is possible that the controlled air-fuel ratio will also change.

(5) During many hours use, it is possible that the air-fuel window of the three way catalyst will change. In such a case, there is no effective response.

(6) During many hours use, it is also possible that the air-fuel window of the three way catalyst will contract. In such a case, a high degree of control is required. However, since the control capacity is constant, it is difficult to carry out such a high degree of control.

SUMMARY OF THE INVENTION

The present invention is directed at providing a solution to the existing problems mentioned above. The present invention is intended to provide an optimizing air-fuel ratio control method for use with a gas engine. The air-fuel ratio control method acts to optimize the air-fuel ratio through use of a control which operates well despite deterioration of the oxygen sensor and the three way catalyst. In other words, the present invention provides a control with robustness, and a control that is independent of the output characteristics of the oxygen sensor.

As is well-known, a three way catalyst has a characteristic known as "storage effect"; that is, a three way catalyst adsorbs surplus oxygen in a condition where there is surplus oxygen in the system (a lean condition), and a three way catalyst carries out an oxidizing reaction with the absorbed oxygen when oxygen runs short (a rich condition). The storage effect of a three way catalyst looks as if the three way catalyst has a kind of a buffer effect on oxygen change. It is considered that the storage effect is most pronounced when the three way catalyst is fresh, while the storage effect tends to lessen when the three way catalyst deteriorates.

Figure 12:
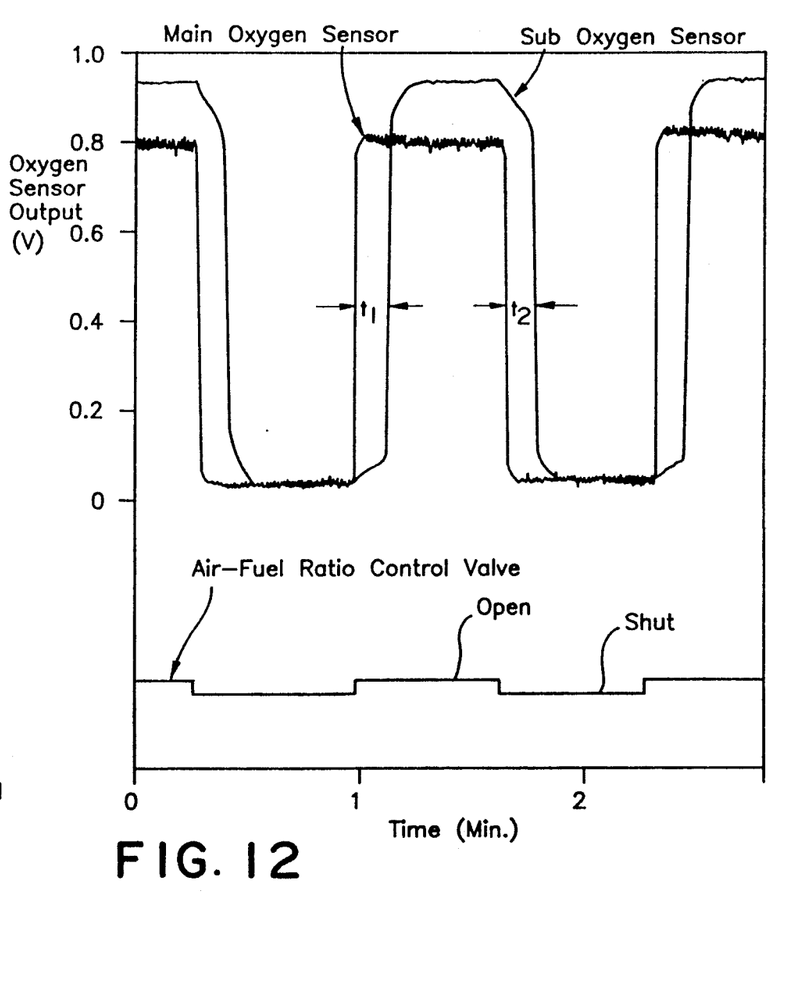
FIGS. 12 and 13 are characteristic diagrams of oxygen sensor output vs. time.

FIG. 12 shows a responded waveform (an output characteristic) of a sub oxygen sensor 12, which waveform is generated when air-fuel ratio control valve 8 is opened and shut alternately (in a step-like manner). In said waveform, a response delay $t_1$ relative to the output signal of main oxygen sensor 11 is as long as 10–20 sec.

Since it is hard to conclude that such a response delay is caused by a transmission delay of exhaust gas in catalysts, it seems to be due to said storage effect.

Figure 13:
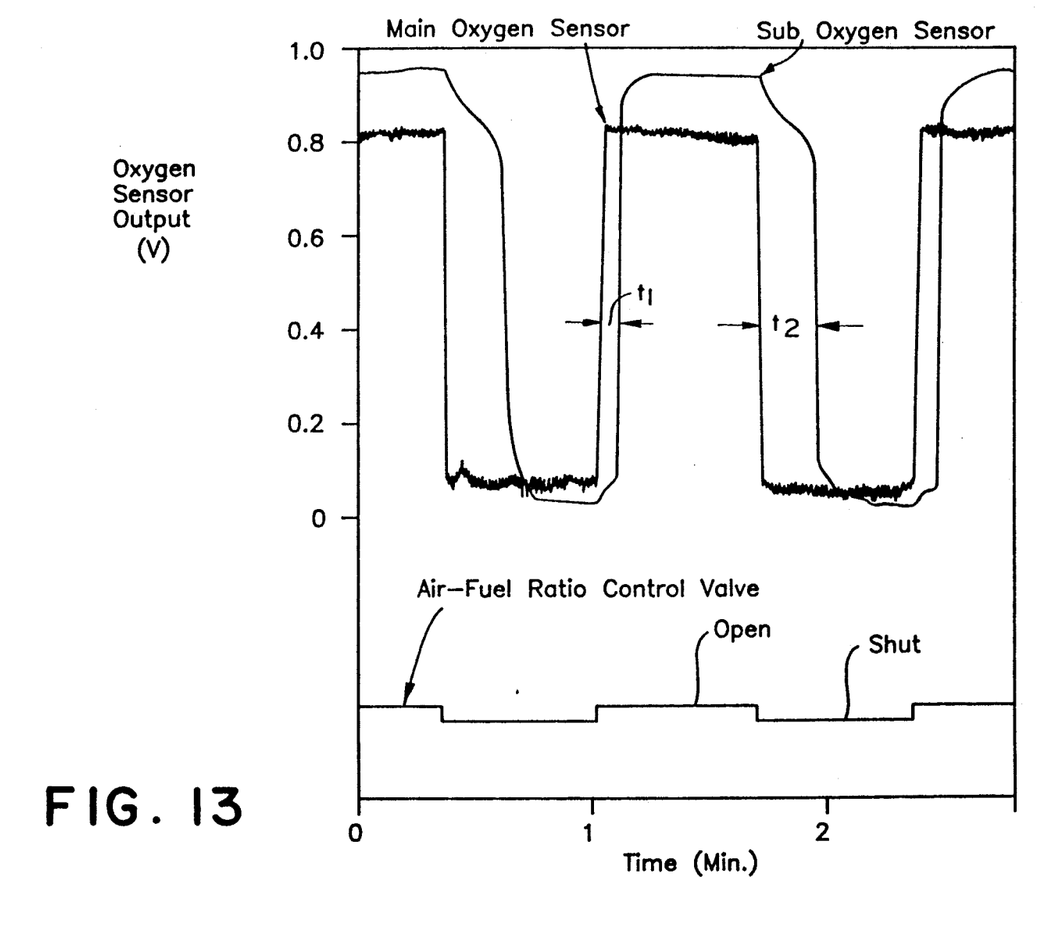

Also, FIG. 13 shows a responded waveform of the sub oxygen sensor, which waveform is generated when an alternate opening and shutting is made in a more rich state of mean air/fuel (A/F) than that of FIG. 12. In FIG. 13, there is a time delay $t_2$ between trailing points of inflection in outputs (waveform) of the main oxygen sensor and the sub oxygen sensor. A period of the time-delay $t_2$ being shown in FIG. 13 is extremely long relative to the corresponding period shown in FIG. 12. It is considered that such behavior occurs because a quantity of oxygen being absorbed in the three way catalyst, which oxygen is consumed for an oxidation in a rich condition, is more plentiful than another oxygen quantity consumed in the state shown in FIG. 12. Consequently, a large quantity of oxygen is absorbed by the three way catalyst, when a lean condition occurs.

As above-mentioned, if a state of alternate opening and shutting varies, both the state of the storage effect of the three way catalytic and the response delay of the subsensor of oxygen should vary. Since the storage effect depends on conditions such as quantity of adsorbed oxygen, density of oxygen, rate of exhaust flow, etc., alternate opening and shutting in the rich condition of mean A/F will delay the trailing point of inflection, while alternate opening and shutting in the lean condition of mean A/F will delay the leading point of inflection.

Figure 14:
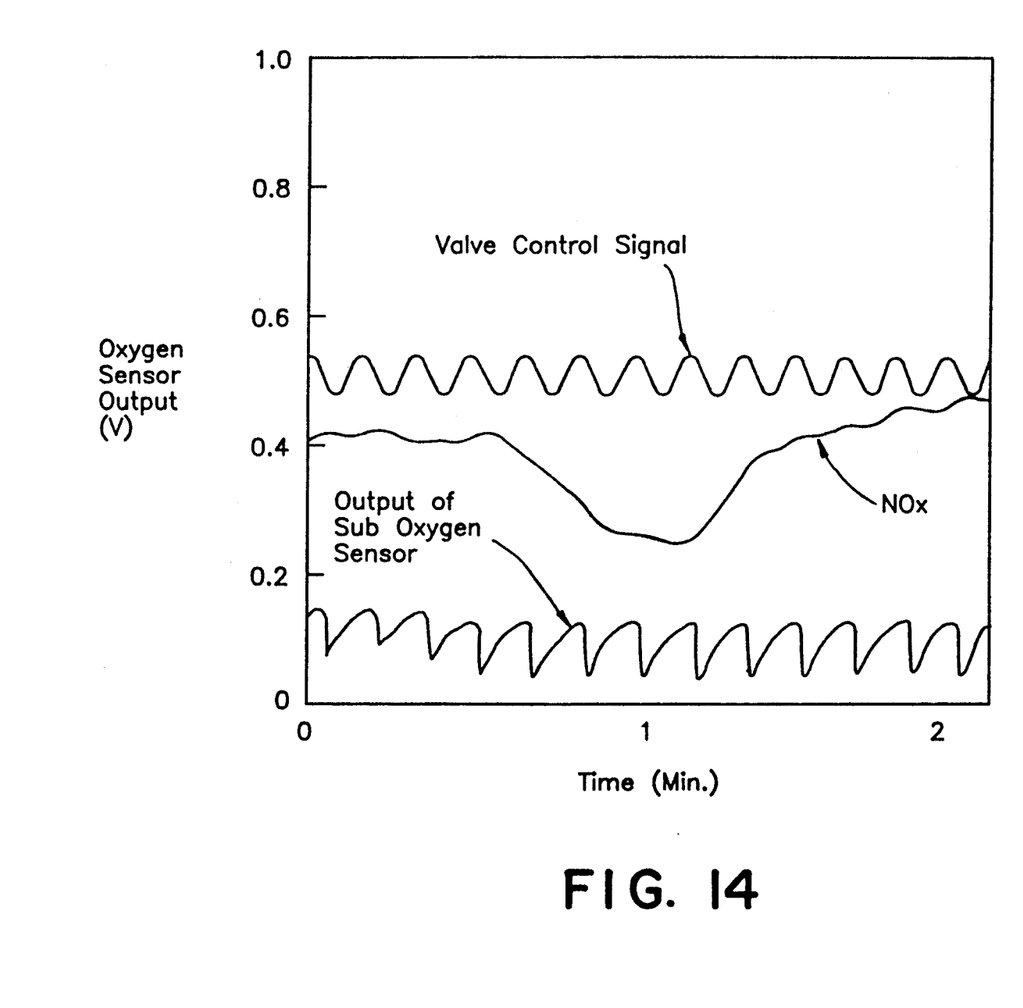
FIGS. 14 and 15 are diagrams showing responded waveforms of the sub oxygen sensor when the air-fuel ratio control valve is modulated with a 0.1 Hz sinusoidal wave.
Figure 15:
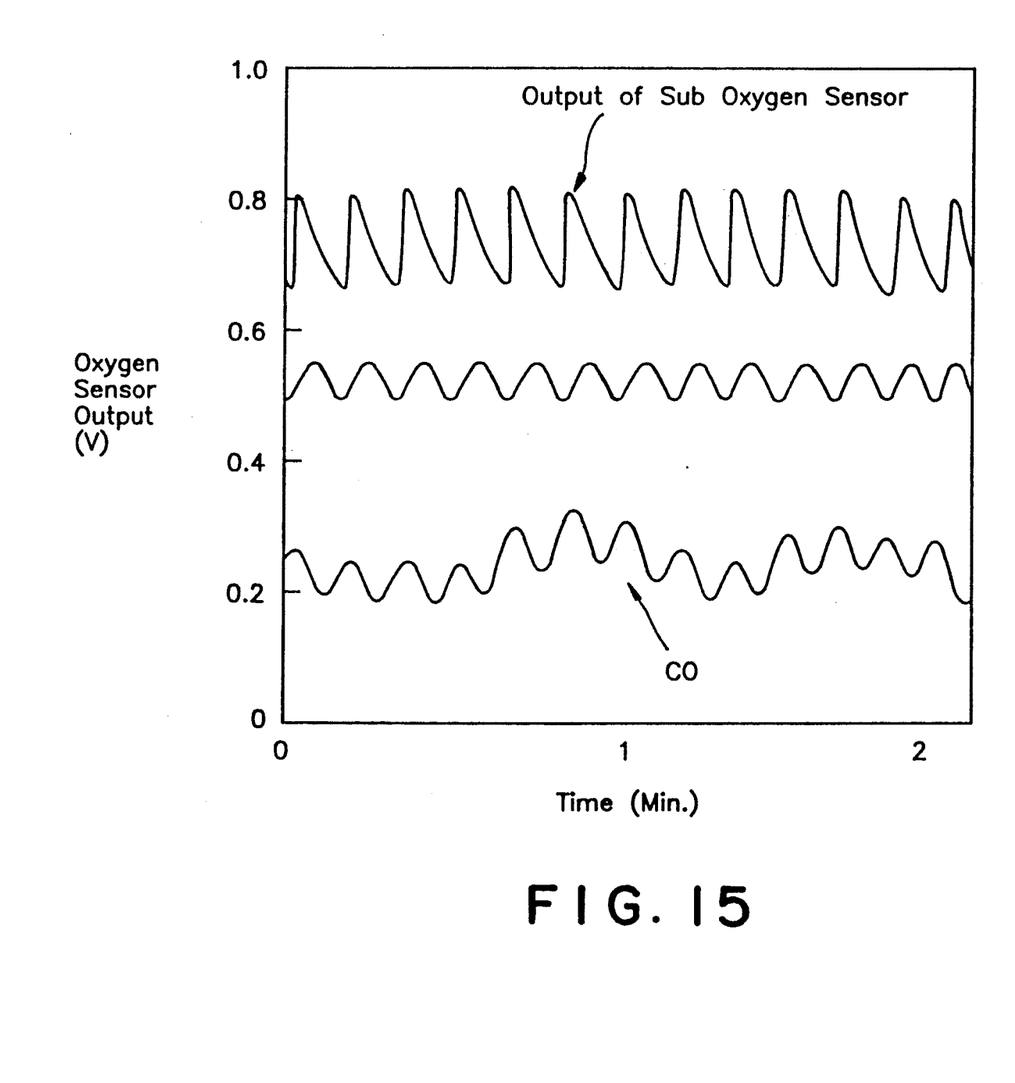

FIGS. 14 and 15 show response waveforms of the sub oxygen sensor when the air-fuel ratio control valve is opened and shut alternately along with sinusoidal waves at a frequency of 0.1 Hz. FIG. 14 shows the case where a center of amplitude is located on a side in which the rich condition will occur. FIG. 15 shows a case where the center of amplitude is located on a side in which the lean condition will occur. Referring to FIGS. 14 and 15, it is evident that according to the location of the center of amplitude, the leading edge is delayed in the case shown in FIG. 14 and the trailing edge is delayed in the case shown in FIG. 15. As described above, in a system known as "a double oxygen sensor system" (carrying out a control with main sensor and subsensor of oxygen 11 and 12 applied both in front and in the rear of a three way catalytic 10) the control is carried out in the rich condition side for safety against $NO_x$, and when the three way catalyst is fresh, this storage effect appreciably aggravates the response characteristic (in other words, due to the storage effect, trailing points of inflection will delay) of the sub oxygen sensor, and therefore, the storage effect becomes one of the causes that makes control difficult. Conversely thinking, however, a control point at which the time delay on the leading and trailing points of inflection are even can be considered to be a point that the storage effect should be acted, and that he center of alternate opening and shutting becomes optimum. In other words, such a center of alternate opening and shutting is considered to be the optimum point in the air-fuel ratio control state.

As a variety of tests have produced results in compliance with the above-mentioned principle, the present invention is made based on this principle.

In the present invention, there is disclosed a method for controlling the air-fuel ratio of a gas engine, comprising the steps of:

modulating a vibrational drive current for driving a by-pass valve with waveforms such as a rectangular wave, sinusoidal wave, triangular wave, etc., with predetermined periods and amplitudes, in response to signals transmitted from a main oxygen sensor and a pressure sensor, said main oxygen sensor being installed in an up-stream side relative to a three way catalyst interposed on an exhaust line of the gas engine, and said pressure sensor being installed on an intake line which includes a mixer;

detecting distortions of responded waveforms of signals transmitted from a sub oxygen sensor, which sensor is installed on a down-stream side of the three way catalyst; and controlling the drive current so as to remove the distortions, in order to optimize the air-fuel ratio of the gas engine.

In the present invention, the storage effect of the three way catalyst is detected. Based on the storage effect and consequent response delay of the oxygen sensor, the drive current for driving the air-fuel ratio control valve can be controlled in a manner that optimizes the air-fuel ratio.

Since the magnitude of the oxygen sensor output is not directly applied in this process, the output characteristic of the oxygen sensor will not affect the control. Similarly, it is hard to conclude that a deterioration of the oxygen sensor will affect the drive current, in a condition that the sensor output can be reasonably detected. Since it seams that the optimum point for the storage effect is considered to be the optimum point for the controlled state of air-fuel ratio, the control has good operational characteristics and robustness upon a deterioration of the three way catalyst.

DETAILED DESCRIPTION OF THE PREFERRED EMBODIMENT

Preferred embodiments of the present invention are explained hereinafter with reference to the figures.

Figure 1:
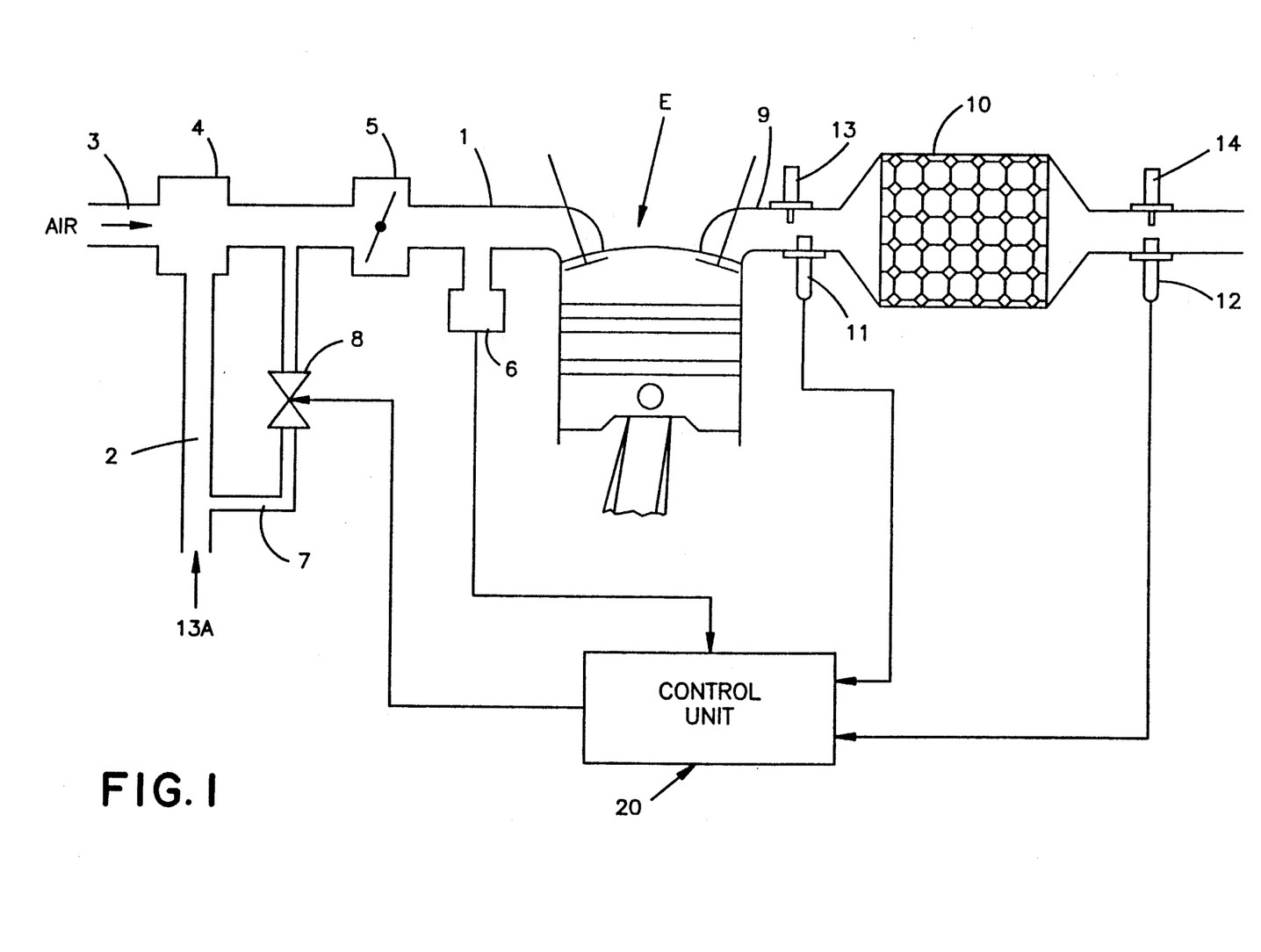
FIG. 1 is a general block diagram showing apparatus for carrying out the present invention.

A system for carrying out the present invention is shown in FIG. 1. The system is similar in some respects to the system shown in FIG. 10, except that the control mode of control unit 20 is different than the aforementioned control unit 15.

Figures 2, 3:
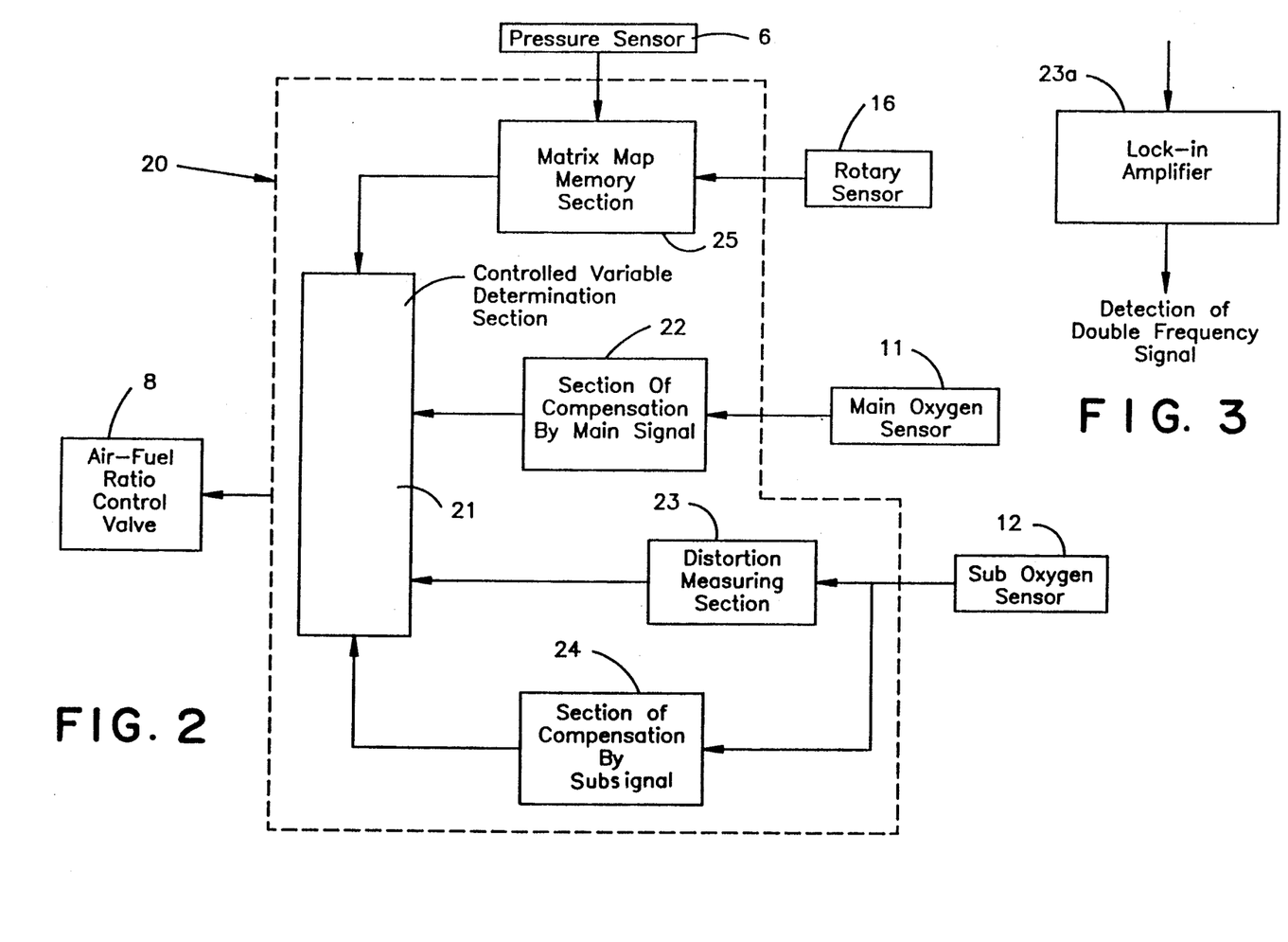
FIG. 2 is a control block diagram.
FIG. 3 to FIG. 5 are diagrams showing different embodiments of the distortion detecting section.

FIG. 2 shows a control block diagram for executing all of control modes I-VIII described hereinafter.

Control unit 20 is provided with a controlled variable determination section 21. A compensation section 22 for a main signal with which section the main oxygen sensor 11 is joined, a distortion measuring section 23 being joined with the sub oxygen sensor 12, a compensation section 24 for the sub signal, and a matrix map 25 being joined with the pressure sensor 6 and a rotary sensor 16 are connected to the determination section 21. The controlled variable determination section 21 determines the controlled variable based on signals transmitted from all of the sections 22-25, then transmits an output to the air-fuel ratio control valve 8.

I. Basic Mode

In one mode of the invention, the drive current of air-fuel ratio control valve 8 oscillated with waveforms such as a rectangular wave, sinusoidal wave, triangular wave, etc., and distortions (i.e., response delays or asymmetry of responded waveforms from the sub oxygen sensor 12) are detected. Then a feedback is transmitted so as to even response delays of leading and trailing points of inflection or to make the asymmetry of the waveform symmetrical. This mode is concretely explained as follows:

(a) In a distortion measuring sections 23a shown in FIG. 3 (generally designated 23 in FIG. 2), by means of a lock-in amplifier or the like detecting only a specific frequency component, a double frequency component of the valve oscillation frequency of the sub oxygen sensor 12 of oxygen is detected, and then, a feedback for nullifying the double frequency component.

Figure 4:
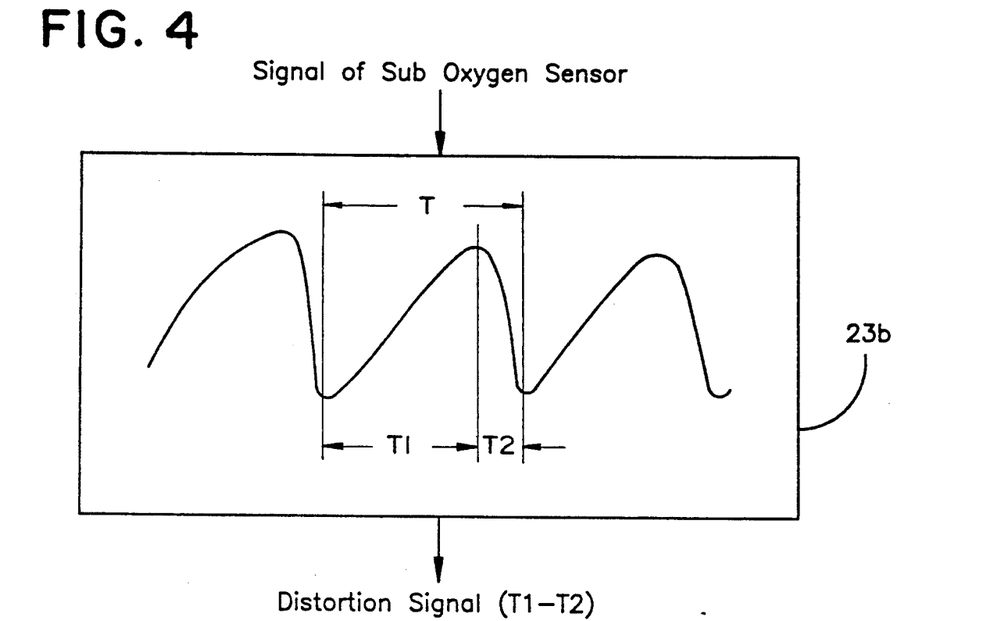

(b) In a distortion measuring section 23b shown in FIG. 4 (generally designated 23 in FIG. 2), a time-period $T_1$ from a leading of inflection to a trailing point of inflection and a time-period $T_2$ from said trailing point of inflection to another leading point of inflection, which time-periods $T_1$ and $T_2$ are of one time-period T, are measured. And then, a feedback is transmitted to the amplitude center so as to even the both time-periods ($T_1$ and $T_2$) mentioned above, that is, so as to nullify a distortion signal (represented as "$T_1-T_2$"). By means of such a feedback, the result shown in FIG. 13 is attained.

Figure 5:
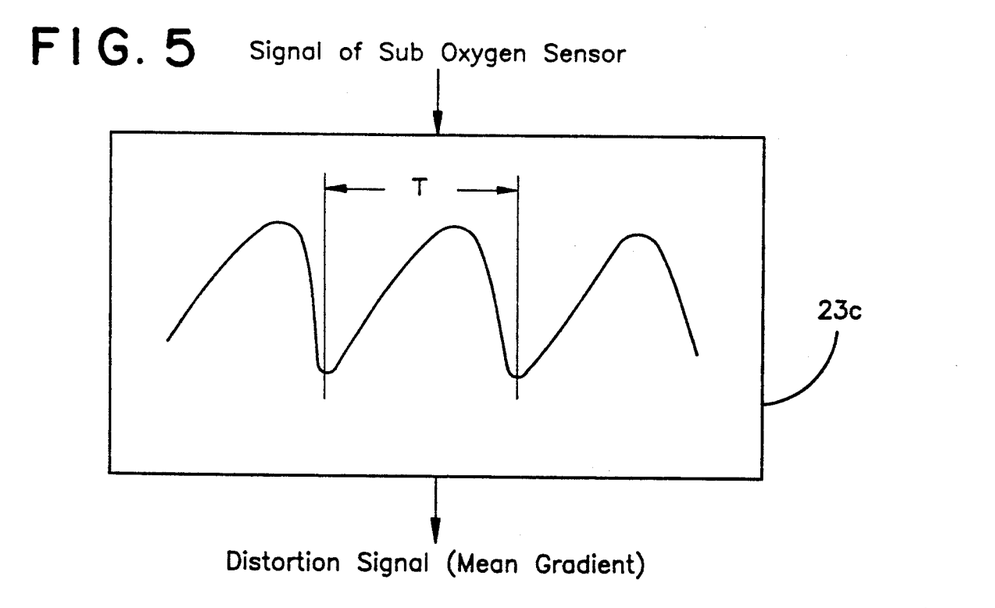

(c) In a distortion measuring section 23c shown in FIG. 5 (generally designated 23 in FIG. 2), a mean gradient of one time-period T is measured, a feedback is transmitted to the amplitude center so as to nullify the mean gradient, that is, so as to make the waveform symmetrical.

Figure 6:
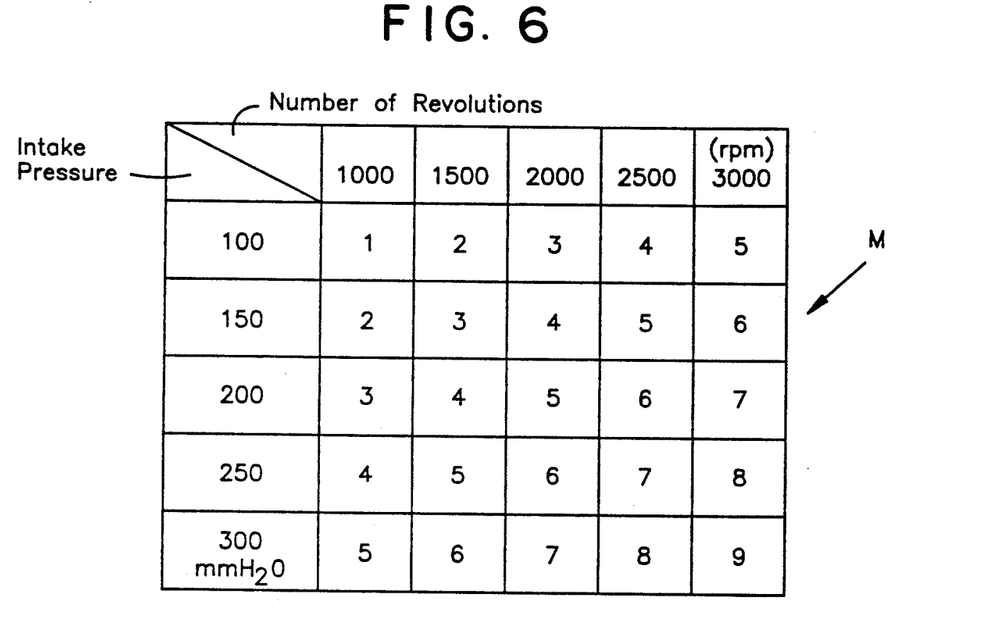
FIG. 6 is a matrix map diagram.

II. Mode for using a matrix map of amplitude centers for an intake pressure and number of revolutions In the previously described mode, any disturbance, such as a sudden load fluctuation, etc. would prevent an appropriate response. In Mode II, a matrix map M of amplitude centers shown in FIG. 6, which map corresponds with an intake pressure from the pressure sensor 6 indicating a load and number of revolutions, into a matrix map section 25. (In the map M, there are the control constants indicating the amplitude center, at which center the distortion of responded waveform of sub oxygen sensor 12 is nullified.) And then, the amplitude center is immediately shifted in response to a domain change caused due to a load fluctuation or the like, so that the responsiveness of the system is improved. In addition, the control constant is varied dependant upon the setting of the mixer, weather conditions, etc.

III. Mode for using an output of the subsensor of oxygen together

Figure 7:
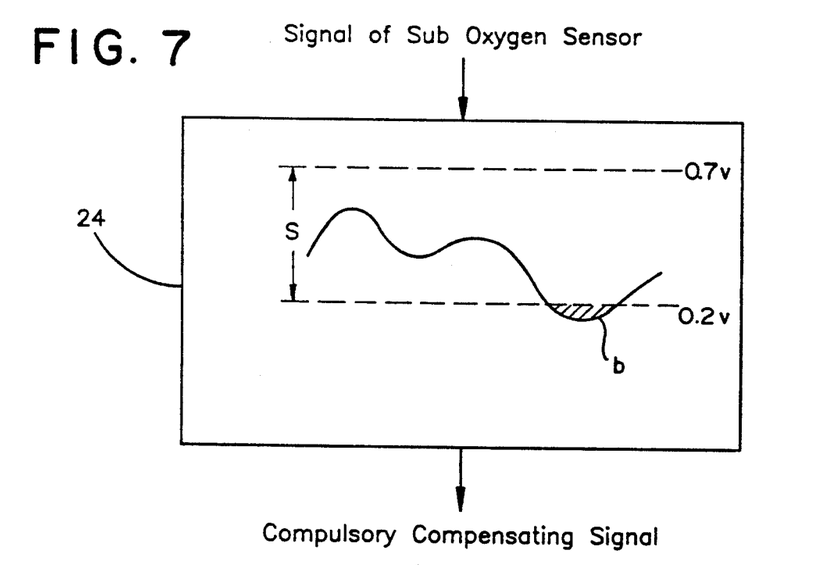
FIG. 7 is a diagram showing an embodiment where the compensation section is controlled by the subsignal.

In addition to modes I and II described above, in order to improve responsiveness for a sudden disturbance such as a load fluctuation, etc., Mode III includes a step for detecting also an output of the sub oxygen sensor 12, and a step for transmitting a feedback of compulsory compensating signal so as to immediately return the sub oxygen sensor output into normal domain S (0.7–0.2 V) by drawing a conclusion to be abnormal if the output falls below a fixed level (say 0.2 V), in compensating section 24 controlled by the subsignal shown in FIG. 7. And then the output is stabilized within the normal domain S at all times.

IV. Mode for using an output of the main oxygen sensor together

In addition to the above-mentioned processes I and II, an output signal of main oxygen sensor 11 is also detected in this mode, in order to improve the responsibility to a sudden disturbance such as load fluctuation, etc. If the output is beyond a specified range for over a specified time, a feedback is transmitted so as to return the output into a specified range in the same way as that described in reference to FIG. 7.

V. Mode for changing a threshold voltage of the sub oxygen sensor

Figure 8:
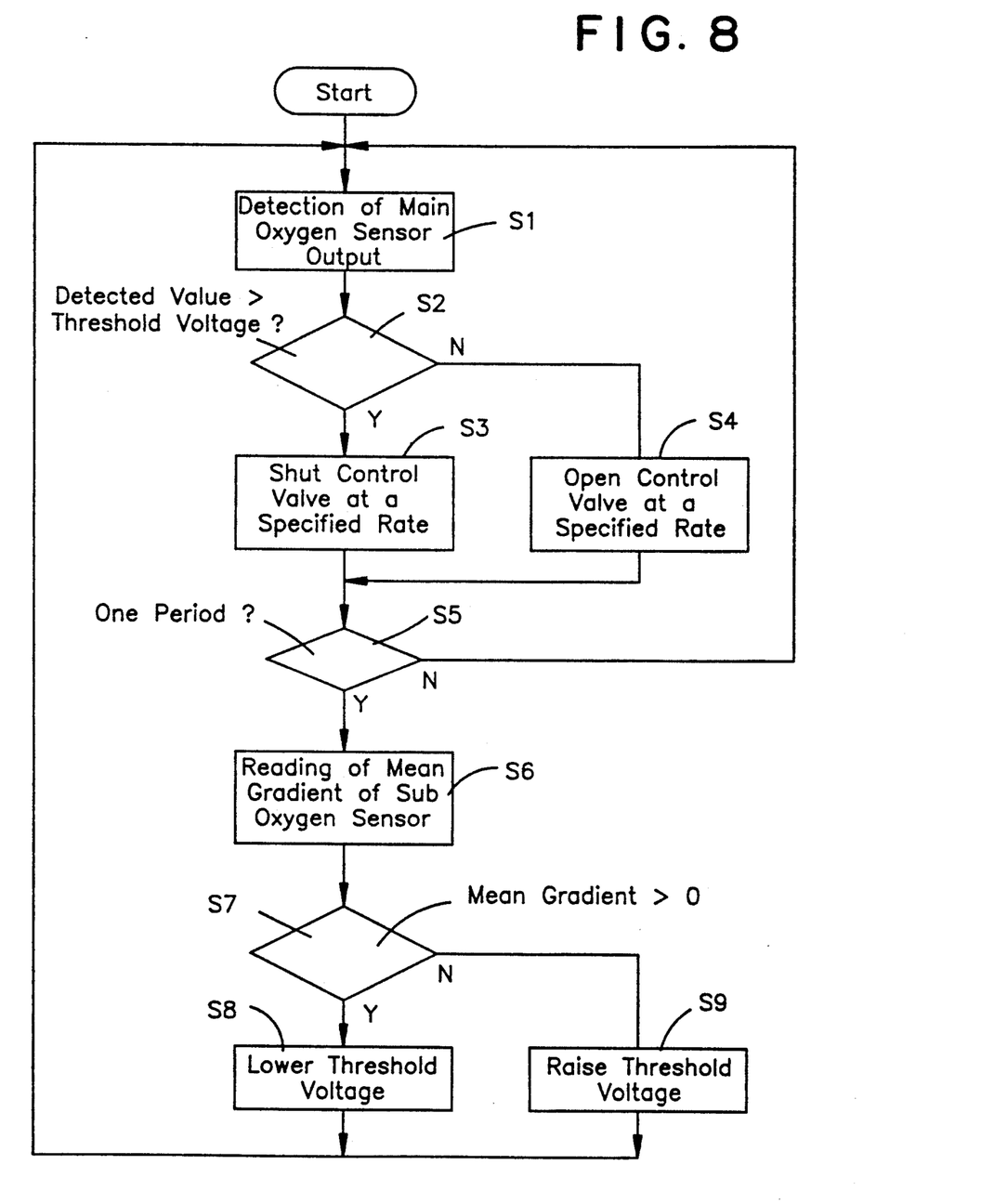
FIG. 8 is a control block diagram for changing the threshold of the sub oxygen sensor.

In this mode, the difference between the character of the sub oxygen sensor 12 and the air-fuel ratio window which difference is caused by a deterioration, etc. of three way catalyst 10 is corrected. The threshold voltage is changed after detecting an output of the sub oxygen sensor 12 at a point in which the distortion of the sensor is nullified, in the above-mentioned control mode I. That is, as shown in FIG. 8, an output of the main oxygen sensor 11 is detected (Step S1), and then it is determined whether or not the detected output is higher than the threshold voltage (e.g., 0.5 V) (Step S2). If YES, the air-fuel ratio control valve 9 will be shut at a specified rate (Step S3). If NO, the air-fuel ratio control valve 8 will be opened at a specified rate, and then a process represented by Step S5 is carried out. In Step S5, whether or not the output waveform of the main oxygen sensor has run on for one period is judged. If YES, a mean gradient of the output waveform of the sub oxygen sensor 12 is read (Step S6 and FIG. 5). Then whether or not the mean gradient read in Step 6 is larger than 0 is decided (Step S7). If YES, the threshold voltage is changed (or shifted) at a lower level (Step S8). If NO, the threshold voltage is changed at a higher level (Step S9).

VI. Mode for deciding a deteriorated state of three way catalyst 10 by detecting the output amplitude of sub oxygen sensor 12

The air-fuel ratio control valve 8 is vibrated at a specified amplitude and a specified frequency, so as to sweep the amplitude center from the rich side to the lean side. Then, the deteriorated state is decided due to the amplitude of a responded signal generated form the sub oxygen sensor.

VII. Mode for transmitting a feedback so that the amplitude of the responded signal generated from sub oxygen sensor 12 is constant Before executing the control mode I mentioned above, the deteriorated state of three way catalyst 10 is decided by mode VI above. Then the amplitude and frequency of the air-fuel ratio control valve 8 is controlled so that the amplitude of the responded signal generated from the sub oxygen sensor 12 stays within a specified range.

VIII. Mode for changing the threshold voltage of the main oxygen sensor

In a manner the same as the above-mentioned mode V, due to the output signal distortion of sub oxygen sensor 12, the threshold voltage of main oxygen sensor 11 is changed.

Figure 9:
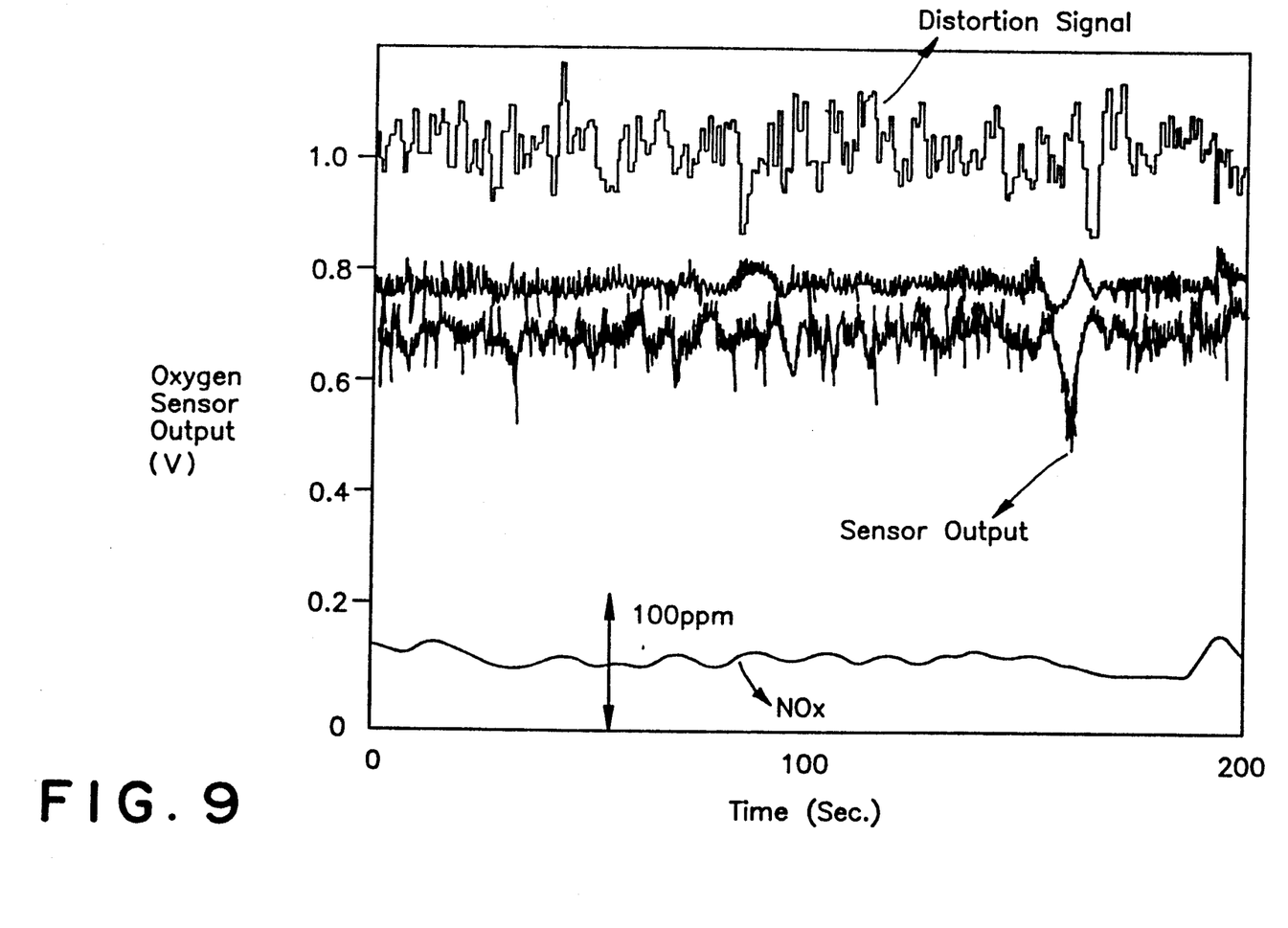
FIG. 9 is a characteristic diagram of oxygen sensor output vs. time for showing examples of experimental results.

One of the experimental examples, that the above-mentioned control modes have carried out, is shown in FIG. 9.

As described above, the present invention achieves the following effects:

(1) The optimum control of the air-fuel ratio can be obtained, and purification efficiency can be improved.

(2) Overshoot caused by a delay of the three way catalyst can be prevented by the sub oxygen sensor. In prior devices, since there is a time delay of the sub oxygen sensor, the valve response is delayed. Therefore, there is a trend of overshooting which is observed both on rich or lean side. However, in the present invention, such overshooting can be improved upon.

(3) Window influence caused by the aging of the three way catalyst and the oxygen sensors can be removed.

(4) The deteriorated state of the three way catalytic can be monitored.

What is claimed is:

1. Method for controlling air-fuel ratio of a gas engine, comprising the steps of:
   modulating a vibrational drive current for driving, with predetermined periods and amplitudes, a by-pass valve with a geometric waveform in response to signals transmitted from a main oxygen sensor and a pressure sensor, said main oxygen sensor being installed on an up-stream side relative to a three way catalyst interposed on an exhaust line of the gas engine, and said pressure sensor being installed on an intake line in line with a mixer;
   detecting distortions of responded waveforms of signals transmitted from a sub oxygen sensor installed on a down-stream side of said three way catalyst; and
   controlling said vibrational drive current so as to remove said distortions, in order to improve the air-fuel ratio of the gas engine.

2. An apparatus for controlling air-fuel ratio of a gas engine, comprising:
   means modulating a vibrational drive current for driving a by-pass valve with a geometric waveform with predetermined periods and amplitudes, in response to signals transmitted from a main oxygen sensor and a pressure sensor, said main oxygen sensor being installed on an up-stream side relative to a three way catalyst interposed on an exhaust line of the gas engine, and said pressure sensor being installed on an intake line in line with a mixer;
   means for detecting distortions of responded waveforms of signals transmitted from a sub oxygen sensor is installed on a down-stream side of said three way catalyst; and
   means for controlling said vibrational drive current so as to remove said distortions, in order to improve the sir-fuel ratio of the gas engine.

* * * * *